Nov. 22, 1966     D. A. HAY     3,286,334

PRODUCTION OF DISPERSION HARDENED MATERIALS

Filed July 16, 1965

INVENTOR.
Donald A. Hay
BY
Morse, Altman & Oates
ATTORNEYS

United States Patent Office 3,286,334
Patented Nov. 22, 1966

3,286,334
PRODUCTION OF DISPERSION
HARDENED MATERIALS
Donald A. Hay, Wellesley, Mass., assignor to Contemporary Research, Inc., Waltham, Mass., a corporation of Delaware
Filed July 16, 1965, Ser. No. 472,627
5 Claims. (Cl. 29—528)

The present invention relates to metallurgy and more particularly, to the production of metallurgical compositions involving an outer phase and an inner phase. The outer phase, a relatively soft metal, provides a desired physical characteristic such as electrical conductivity. The inner phase, an insoluble refractory compound, provides another physical characteristic such as resistance to softening. For example, the conductivity of a relatively soft copper material is maintained while its resistance to softening is greatly increased when particles of a relatively hard compound are dispersed therein. However, in stirring particles into a melt, particularly refractory particles into a copper melt, difficulties have been encountered in wetting the particles to be dispersed because of the high surface tension of the melt.

The primary object of the present invention is to enable the dispersion of refractory particles in a metallic melt by directing the particles into the melt via a high temperature, high velocity stream which substantially reduces the surface tension of the melt to facilitate the infusion of the refractory particles.

A more specific object of the present invention is to provide a high conductivity, softening resistant metallurgical composition by: selecting a high conductivity, relatively soft metal such as copper and relatively hard particles, composed for example of a inorganic compound, for example a refractory inorganic compound, heating the copper to provide a melt and agitating the melt to provide convection therein; generating a gas stream at high temperature and high speed incorporating the hard particles; impinging the stream into the melt; dispersing the refractory material within the melt by continuance of the agitation; and cooling the system while the inner phase is dispersed to provide the desired combination of properties.

Other objects of the present invention will in part be obvious and will in part appear hereinafter.

Figure 1:
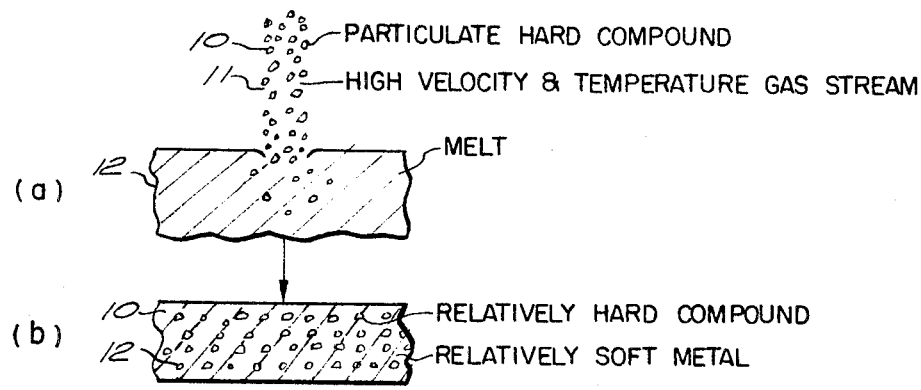
Figure 2:
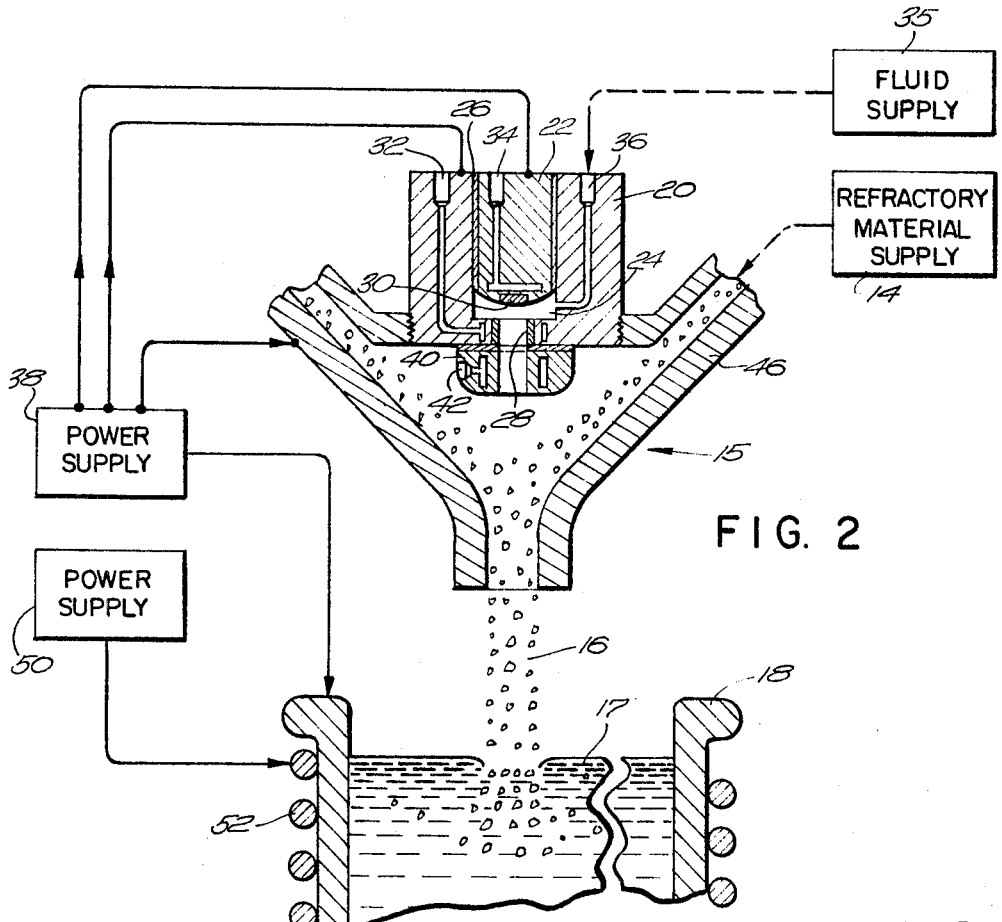

The invention accordingly comprises the materials and processes involving the sequence and combination of steps and components which are exemplified in the following detailed disclosure, the scope of which will be indicated in the appended claims. For a fuller understanding of the nature and objects of the present invention, reference should be had to the following detailed description, taken in connection with the accompanying drawings wherein:

FIG. 1 is an exaggerated cross-sectional view of a material produced in accordance with the present invention; and FIG. 2 illustrates apparatus for effecting the process of the present invention in conjunction with materials undergoing a process of the present invention.

Generally, the process illustrated herein as embodying the present invention involves directing refractory particles 10 via a high temperature, high velocity gas stream 11 into a metal melt 12. In various forms, the stream is established by an inert gas expelled through a nozzle from a heater, by a plasma-torch or by a flame-spraying torch, the refractory particles in each case being injected appropriately into the stream. The melt is at a temperature above the melting point of the melt. For best results, the temperature of the stream is at least as great as the melting point of the melt and the velocity of the stream is at least 1000 centimeters per second. During infusion of the refractory particles, the melt is agitated, as by ultrasonic or inductive energization, in order to diffuse the refractory particles throughout the melt. The resulting composition, when cooled to a solid, substantially retains the desirable characteristics of the internal phase but its hardness is greatly increased. Generally, the external phase is a metal, such as copper, nickel, silver, gold, aluminum, platinum and palladium. Preferably, the internal phase is an oxide, carbide, boride, nitride, sulfide, silicide or phosphide. For best results, the particle size of at least 90% by weight of the internal phase ranges from .01 to 50 microns. The internal phase preferably ranges from .1 to 25% by total weight.

In the apparatus specifically illustrated in FIG. 2, refractory particles from a supply 14 are directed via a plasma stream 16 into a melt 17. Stream 16 advantageously is shown as being produced by a plasma torch 15.

Generally, plasma torch 15 is of the type comprising an outer element 20 and an inner element 22, which define therebetween a chamber 24 and which are electrically insulated from each other by a non-conducting annulus 26. A direct current potential between elements 20 and 22 is concentrated primarily between a cylindrical electrode 28 at the inner periphery of an aperature through element 20 and a flat electrode 30 contiguous thereto and axially aligned therewith. Elements 20 and 22 are cooled by a fluid applied by suitable conduits 32 and 34 respectively. The surface of chamber 24 is protected, when the plasma generator is in operation, by a fluid which is injected from a supply 35 through a conduit 36 obliquely with respect to the surface of chamber 24. In operation a direct current potential is applied across electrodes 28 and 30 from a power supply 38 and a fluid, for example an inert gas such as nitrogen or noble gas, i.e. neon, argon, crypton, etc., is injected into chamber 24 through port 36 from fluid supply 35. A thermal pinch effect results from cooling of the outer region of the plasma arc, which consequently is less conductive than the inner region. A magneto-hydrodynamic pinch effect constricts the arc further in consequence of the Faraday principle that streams of ionized particles constitute electrical currents which, when traveling in the same direction, attract one another. In the plasma generator, the plasma is ejected through chamber 24 and through an auxiliary dispersing nozzle 40, which is cooled by a fluid circulating in conduit 42. In the illustrated process, the plasma is applied to a stream of refractory particles from supply 14, these refractory particles being directed into the path of the plasma by a funnel 46, which is composed of an electrically conducting metal provided with a potential that is positive with respect to the charge across electrodes 28 and 30. The potential of funnel 46 is different from the potential of melt 17 in crucible 28, both potentials being established by power supply 38. Heating and agitation of melt 17 both are accomplished by the application of alternating current from power supply 50 to an induction coil 52 surrounding container 18.

In a specific example of the process herein, particles of dimolybdenum carbide of the order of 1 micron in extent are fed into funnel 46 for incorporation into plasma stream 16. Typically, electrode 30 is approximately 1/8 inch in diameter, the orifice provided by electrode 28 is approximately 3/32 inch long and 0.080 centimeter in diameter, the potential difference between electrode 30 electrode 28 is approximately 93 volts D.C. and the inert gas is introduced at a pressure of 15.5 p.s.i. With proper spacing of the plasma torch from the melt, the resulting temperature of the plasma stream at the surface of melt 17 is approximately 5000° C. and the resulting velocity of the stream at the surface of melt 17 is in excess of 0.1 Mach, i.e. of sonic magnitude. The melt is composed of copper, as a practical matter at a temperature ranging between 1500 and 1700° C. Infusion of the refractory particles and agitation are continued until the refractory particles constitute approximately 3% by total weight of the copper and the particles. After the composite material is cooled to room temperature, it is worked, for example rolled, in order to compress it about 45%. Although ordinarily copper starts to soften at about 400° F. and is fully soft by 570° F., the composite material here shows no substantial softening to 800° F. and is not yet fully soft by 950° F.

Thus the illustrated process of the present invention provide improved resistance to softening without appreciable sacrifices of conductivity, by means of a novel relationship of materials. Since certain changes may be made in the above disclosure without departing from the scope of the invention herein, it is intended that all matter described in the foregoing specification and illustrated drawings be interpreted in an illustrative and not in a limiting sense.

What is claimed is:

1. A process for interspersing a relatively hard particulate material in a relatively soft metal, said process comprising the steps of liquefying the entire mass of said soft metal to a melt while retaining it against outward flow by the walls of a container, directing said hard particulate material in a gaseous stream toward the upper surface of said melt with sufficient speed relative to said melt to penetrate into said melt notwithstanding counter forces established by the surface tension of said melt, dispersing said particulate material substantially uniformly throughout said melt, said metal being selected from the class consisting of copper, nickel, silver, gold, aluminum, platinum and palladium, said particulate material being composed of a refractory compound selected from the class consisting of oxides, carbides, borides, nitrides, selenides, silicides and phosphides, said particulate material ranging substantially between 0.01 and 50 microns in extent and ranging between 0.1 and 25% by total weight of the final product, said metal and said particulate material being substantially mutually insoluble, the temperature of said gaseous stream being at least as great as the melting point of said melt and the velocity of said stream being at least 1000 centimeters per second, solidifying said melt and working it by compression in at least one dimension in order to impart increased strength thereto.

2. The process of claim 1 wherein said gaseous stream includes a plasma and said dispersing includes agitating.

3. A process for interspersing a relatively hard particulate material in a relatively soft copper matrix, said process comprising the steps of liquefying the entire mass of said copper matrix to a melt while retaining it against outward flow by the walls of a container, directing said hard particulate material in a gaseous stream toward the upper surface of said melt with sufficient speed relative to said melt to penetrate into said melt notwithstanding counter forces established by the surface tension of said melt, dispersing said particulate material substantially uniformly throughout said melt, said particulate material being composed of a refractory compound selected from the class consisting of oxides, carbides, borides, nitrides, selenides, silicides and phosphides, said particulate material ranging substantially between 0.01 and 50 microns in extent and ranging between 0.1 and 25% by total weight of the final product, said matrix and said particulate material being substantially insoluble, the temperature of said gaseous stream being at least as great as the melting point of said melt and the velocity of said stream being at least 1000 centimeters per second, solidifying said melt and working it by compression in at least one dimension in order to impart increased strength thereto.

4. The process of claim 3 wherein said dispersing includes agitating.

5. The process of claim 4 wherein said stream includes a plasma.

References Cited by the Examiner

UNITED STATES PATENTS

| | | | |
|---|---|---|---|
| 2,428,823 | 10/1947 | Wright | 22—203 X |
| 2,841,687 | 7/1958 | Richter | 219—76 |
| 2,909,422 | 10/1959 | Schwabe | 75—10 |
| 2,922,869 | 1/1960 | Giannini et al. | 219—75 |
| 2,973,426 | 2/1961 | Casey | 219—75 |
| 3,016,447 | 1/1962 | Gage et al. | 219—76 |
| 3,075,066 | 1/1963 | Yenni et al. | 219—76 |
| 3,101,385 | 8/1963 | Robinson | 13—33 |

OTHER REFERENCES

"30,000 Degrees with the Plasma Jet," Journal of Metals, Jan. 1959, pp. 40–42.

"Plasma for Extractive Metallurgy," by Tyler, Paul M., Journal of Metals, Jan. 1961, pp. 51–54.

J. SPENCER OVERHOLSER, *Primary Examiner.*

V. K. RISING, *Assistant Examiner.*